March 29, 1938.    J. W. MacCLATCHIE    2,112,592
VALVE
Filed March 5, 1935

INVENTOR.
John W. MacClatchie
BY
R. W. Smith
ATTORNEY.

Patented Mar. 29, 1938

2,112,592

UNITED STATES PATENT OFFICE 2,112,592

VALVE

John W. MacClatchie, Los Angeles, Calif., assignor to MacClatchie Manufacturing Company of California, Compton, Calif., a corporation of California Application March 5, 1935, Serial No. 9,375

4 Claims. (Cl. 251—5)

This invention is a valve, and has for an object to protect all metal surfaces of the valve against contact with the flow, thereby adapting the valve for use with acids or any fluid which attacks metal.

It is a further object of the invention to provide a flexible liner for the valve, normally having an open bore for passage of fluid and adapted to be twisted so as to shut off the bore for closing the valve.

It is a still further object of the invention to twist the flexible liner so as to squeeze it shut at spaced points along its length and thus provide a closure seal at each of a plurality of points.

It is a still further object of the invention to twist the liner and squeeze it shut without excessively transversely distorting the liner such as might cause undue wear and appreciably shorten its life.

It is a still further object of the invention to twist the liner to varying degrees, so as to squeeze it more or less as may be necessary to effectively seal against a particular pressure.

It is a still further object of the invention to twist the liner by operating means which automatically retains any adjusted position so as to keep the liner correspondingly twisted.

It is a still further object of the invention to provide an assembly whereby the liner may be conveniently inserted, removed and replaced, with the liner securely held in the valve body when the parts are assembled.

Figure 1:
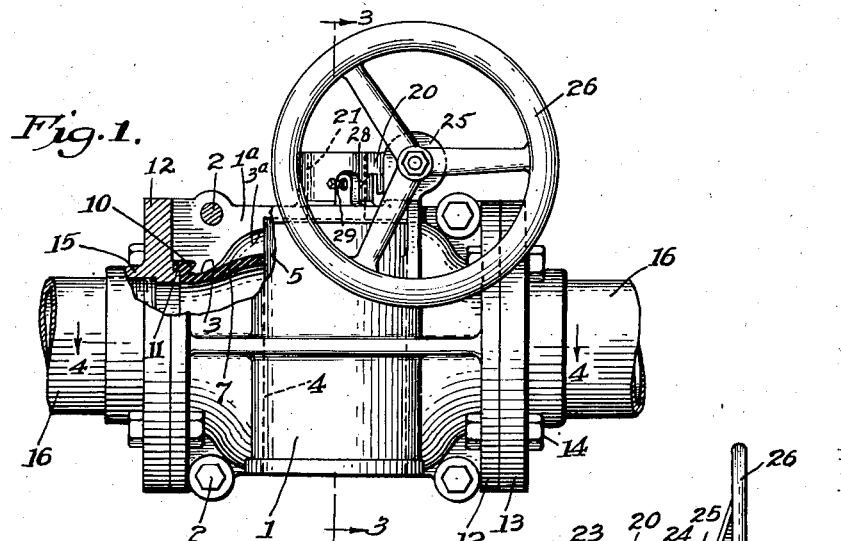
Figures 2, 3:
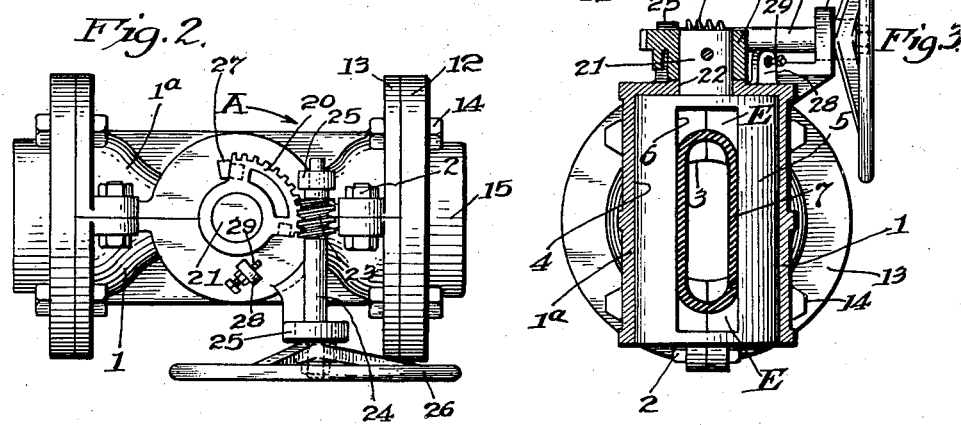
Figures 4, 5:
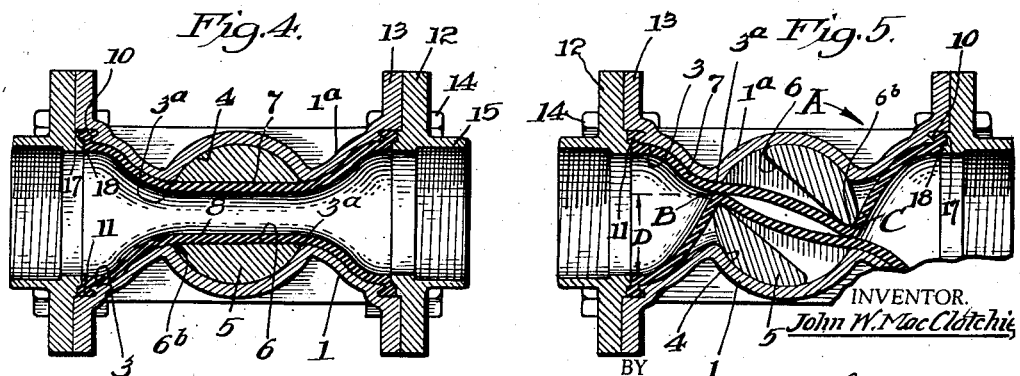

Further objects of the invention will be readily understood from the following description of the accompanying drawing, in which:

Fig. 1 is a side elevation of the valve.
Fig. 2 is a top plan view.
Fig. 3 is a transverse section on the line 3—3 of Fig. 1.
Figs. 4 and 5 are axial sections on the line 4—4, of Fig. 1, showing the valve in open and closed position respectively.

The valve comprises a body which is preferably axially split so as to form cooperating halves 1—1ª which may be releasably held in assembled mating relation by bolts 2. The body has a longitudinal bore 3 for passage of fluid, intercepted at its medial portion 3ª by a transverse bore 4 which is adapted to receive a rotatable plug 5. The bore 3 is preferably circular at its ends, with its medial portion 3ª vertically elongated and horizontally restricted in cross-section as shown at Figs. 1 and 4, and the plug 5 has a transverse bore 6 which is vertically elongated as shown at Fig. 3 so as to substantially correspond to the medial portion 3ª of the bore 3.

A resiliently flexible liner 7 is adapted for reception in the bores 3—6 and is of a material such as rubber which is not injured by acids or other fluids such as might attack metal. The resilient liner is normally cylindrical with its ends of a diameter to fit snugly in the circular ends of bore 3, and when the bores 3—6 are alined the medial portion of the liner conforms to the elongated bores 3ª—6, preferably with some clearance left between the vertical cross-sectional elongation of the liner and the vertical elongation of said bores as shown at E, and with said vertical cross-sectional elongation of the liner permitting horizontal cross-sectional restriction thereof without subjecting the liner to undue stress. The liner thus provides an open bore 8 for flow of fluid through the valve, with the liner completely protecting the body and valve plug against contact by the fluid.

When the plug 5 is turned in the direction of arrow A the liner is transversely twisted in opposite directions at the points B—C so that at each of said points its opposite side walls are squeezed together between a side wall of bore 3ª and a proximate side wall of bore 6 as shown at Fig. 5. The side wall of bore 3ª is preferably rounded off where it meets the bore 4 so as not to form a sharp corner such as might cut the liner when it is squeezed, and for the same reason the side wall of bore 6 is rounded off at its outer end as shown at 6ᵇ. When the liner is thus squeezed its bore is closed so as to seal against passage of fluid at each of the points B—C, with the tightness of the seal determined by the degree to which plug 5 is turned. The squeezing action is obtained with the maximum cross-sectional horizontal distortion to which the liner is subjected (indicated at D) appreciably less than the normal diameter of the liner, and when the liner is cross-sectionally horizontally distorted it may still cross-sectionally vertically expand into the clearance space E so as to compensate for the horizontal cross-sectional restriction of the liner. The liner may thus be distorted and squeezed to provide a tight seal without being subjected to excessive stress or strain; and aside from the clearance, space E which permits necessary vertical cross-sectional elongation of the distorted liner, there are no restricted recesses into which the liner may be crowded so as to unduly squeeze it and cause excessive wear at any point.

The ends of bore 3 preferably form grooves 10 and the ends of the liner are preferably flanged as shown at 11, so that when inserting the liner its ends may be stretched so as to snap the flanges 11 into the grooves 10 as shown at Figs. 4 and 5, whereby the liner is positively held against longitudinal displacement in the bores 3—6. The liner is preferably also locked in place by flanges 12 at the ends of the valve body. As an instance of this arrangement the ends of the valve body may be flanged as shown at 13, and the flanges 12 are bolted thereto as shown at 14 and provide connections whereby lengths of pipe may be secured to the flanges 12. These connections may be threaded nipples 15 adapted to receive lengths of pipe 16. The flanges 12 are preferably shouldered as shown at 17 for reception in the ends of bore 3 so as to longitudinally abut the ends of liner 7, and the flanges are preferably also shouldered at 18 so as to radially engage the liner ends for preventing radial displacement of the liner.

The plug 5 may be turned a maximum distance to provide the tightest possible seal at points B—C, or to save wear on the liner may be turned to a lesser degree which will not squeeze the walls of the liner together as tightly but which may still provide an effective shut off when the pressure of the fluid flowing through the valve is lower, or the plug may be turned to an intermediate position which will restrict the liner bore without completely closing it. Operating means are preferably provided for turning the plug any desired distance, with the operating means preferably automatically retaining any adjusted position to which it is shifted so as to correspondingly restrict or completely shut off the bore of the liner.

For this purpose a worm gear quadrant 20 may be fixed on a stem 21 of plug 5 which projects outwardly through a bearing 22 in the upper end of the valve body, and meshes with a worm 23 which is formed on a shaft 24 which extends across the valve body and which is journaled in bearings 25 projecting upwardly from the body. The shaft 24 may be manually rotated, preferably by a hand wheel 26, and stops 27—28 which may engage the gear quadrant 20 limit rotation of the shaft, so that when turned to its limit of movement in one direction with the gear quadrant abutting the stop 27 the plug 5 is turned for alinement of bores 3—6 as shown at Fig. 4, and when turned to its limit of movement in the opposite direction with the stop 28 abutting the gear quadrant the plug 5 is turned to the position shown at Fig. 5, thereby forming a tight seal at points B—C. The stop 28 is preferably adjustable as shown at 29 so as to regulate the tightness of the seal when the valve is turned all the way to closed position.

The worm drive thus holds the plug 5 against movement when turned to any desired position until the hand wheel 26 is rotated; and by turning the hand wheel in one direction the valve may be completely closed or the passageway through its bore may be only partly restricted, while turning the hand wheel in the opposite direction realines the bores 3—6 so that the liner 7, through its inherent resiliency, may resume its normal position providing an open bore through the valve as shown at Fig. 4.

The invention thus provides simple means for protecting a valve against damage from acids or other fluids which might attack the material of the valve body but which are not injurious to rubber or the like, with the liner which forms the protecting means adapted to be twisted and squeezed together to insure an effective shut off, but with no possibility of the liner being so distorted as to unduly deform and cause excessive wear thereof.

The invention also provides for readily assembling the valve and replacing its liner, and for distorting the liner to provide any desired closure, with the liner automatically held in any desired distorted position until released by manually operating the valve.

I claim:

1. In combination, a valve body having a straight bore which is circular in cross-section at each end and having means at said ends of the bore whereby lengths of pipe may be connected to the body for communication with the bore, the valve body having a second bore intersecting the first bore, a rotatable valve plug journaled in the second bore and having a straight transverse bore cross-sectionally elongated in the direction of the axis of the rotatable plug and adapted for alinement with the first mentioned body bore, a flexible liner in the first mentioned body bore with its medial portion extending through and cross-sectionally elongated by the cross-sectional elongation of the plug bore but having the ends of its cross-sectional elongation spaced from the proximate end walls of the cross-sectional elongation of the plug bore, and means for oscillating the plug for non-alining the plug bore and the first mentioned body bore, the plug bore and the first mentioned body bore cooperating so that said non-alinement of these bores squeezes longitudinally spaced portions of the liner between side walls of the cross-sectionally elongated plug bore and side walls of the first mentioned body bore, with said squeezing actions respectively at opposite ends of the plug bore and at opposite sides of the first mentioned body bore.

2. In combination, a valve body having a bore, the valve body having a second bore intersecting the first bore, a rotatable valve plug journaled in the second bore and having a transverse bore adapted for alinement with the first mentioned body bore, a flexible liner in the first mentioned body bore with its medial portion extending through the plug bore, and means for oscillating the plug for non-alining the plug bore and the first mentioned body bore, the plug bore and the first mentioned body bore cooperating so that said non-alinement of these bores squeezes longitudinally spaced portions of the liner between side walls of the plug bore and side walls of the first mentioned body bore, with said squeezing actions respectively at opposite ends of the plug bore and at opposite sides of the first mentioned body bore.

3. In combination, a valve body having a bore the valve body having a second bore intersecting the first bore, a rotatable valve plug journaled in the second bore and having a transverse bore cross-sectionally elongated in the direction of the axis of the rotatable plug and adapted for alinement with the first mentioned body bore, a flexible liner in the first mentioned body bore with its medial portion extending through and cross-sectionally elongated by the cross-sectional elongation of the plug bore but having the ends of its cross-sectional elongation spaced from the proximate end walls of the cross-sectional elongation of the plug bore, and means for oscillating the plug for non-alining the plug bore and the first mentioned body bore, the plug bore and the first mentioned body bore cooperating so that said non-alinement of these bores squeezes longitudinally spaced portions of the liner between side walls of the cross-sectionally elongated plug bore and side walls of the first mentioned body bore, with said squeezing actions respectively at opposite ends of the plug bore and at opposite sides of the first mentioned body bore.

4. In combination, a valve body having a bore, a rotatable element in the body having a transverse bore cross-sectionally elongated in the direction of the rotary axis of said element and adapted for alinement with the body bore, a flexible liner in the body bore extending through and cross-sectionally elongated by the cross-sectional elongation of the transverse bore but having the ends of its cross-sectional elongation spaced from the proximate end walls of the cross-sectional elongation of the transverse bore, and means for oscillating the rotatable element for non-alining its transverse bore and the body bore, the transverse bore and the body bore cooperating whereby said non-alinement of these bores squeezes the liner between a side wall of the cross-sectionally elongated transverse bore and a side wall of the body bore.

JOHN W. MacCLATCHIE.